(12) United States Patent
Lutz et al.

(10) Patent No.: US 8,985,066 B2
(45) Date of Patent: Mar. 24, 2015

(54) COOLING CIRCUIT

(71) Applicant: Behr GmbH & Co. KG, Stuttgart (DE)

(72) Inventors: Rainer Lutz, Steinheim (DE); Richard Bruemmer, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 105 days.

(21) Appl. No.: 13/672,378

(22) Filed: Nov. 8, 2012

(65) Prior Publication Data

US 2013/0118423 A1 May 16, 2013

(30) Foreign Application Priority Data

Nov. 8, 2011 (DE) .......................... 10 2011 085 961

(51) Int. Cl.
| | |
|---|---|
| F01P 7/14 | (2006.01) |
| F01P 11/02 | (2006.01) |
| F01P 11/00 | (2006.01) |
| F01P 3/20 | (2006.01) |
| F02G 5/04 | (2006.01) |
| F01N 5/02 | (2006.01) |

(52) U.S. Cl.
CPC . F01P 11/00 (2013.01); *F01N 5/02* (2013.01); *F01P 3/20* (2013.01); *F01P 2060/16* (2013.01); *F02G 5/04* (2013.01); *F02G 2260/00* (2013.01); *Y02T 10/166* (2013.01)
USPC .............. 123/41.09; 123/41.01; 123/41.02; 123/41.08; 123/41.1; 123/41.14; 123/41.21; 123/41.29

(58) Field of Classification Search
USPC ............ 123/41.01, 41.02, 41.08, 41.09, 41.1, 123/41.14, 41.21, 41.29
See application file for complete search history.

(56) References Cited

U.S. PATENT DOCUMENTS

| | | | | |
|---|---|---|---|---|
| 3,162,182 | A * | 12/1964 | Gratzmuller | 123/41.08 |
| 4,362,131 | A * | 12/1982 | Mason et al. | 123/41.1 |
| 6,016,774 | A * | 1/2000 | Bokkers et al. | 123/41.1 |
| 6,569,550 | B2 | 5/2003 | Khelifa | |
| 7,823,671 | B2 * | 11/2010 | Inoue et al. | 180/68.4 |
| 2002/0069839 | A1 * | 6/2002 | Kunze et al. | 123/41.1 |
| 2004/0000161 | A1 * | 1/2004 | Khelifa et al. | 62/324.1 |
| 2006/0123824 | A1 * | 6/2006 | Casar et al. | 62/244 |
| 2006/0157000 | A1 * | 7/2006 | Lutze et al. | 123/41.02 |
| 2006/0254538 | A1 * | 11/2006 | Hassdenteufel et al. | 123/41.1 |
| 2007/0289721 | A1 * | 12/2007 | Miyagawa et al. | 165/104.21 |
| 2009/0229543 | A1 * | 9/2009 | Suzuki | 123/41.02 |
| 2010/0037838 | A1 * | 2/2010 | Moench et al. | 123/41.08 |
| 2010/0146969 | A1 * | 6/2010 | Stiermann | 60/616 |

(Continued)

FOREIGN PATENT DOCUMENTS

| | | |
|---|---|---|
| DE | 199 61 825 A1 | 6/2001 |
| DE | 10 2007 057 164 A1 | 6/2008 |

(Continued)

*Primary Examiner* — M McMahon
*Assistant Examiner* — Tea Holbrook
(74) *Attorney, Agent, or Firm* — Muncy, Geissler, Olds & Lowe, P.C.

(57) ABSTRACT

A cooling circuit, in particular of a motor is provided that includes a drive unit with a cooling circuit, through which coolant heated in the drive unit flows, a first heat exchanger which emits heat from the coolant to the environment and a device for energy recovery with a second heat exchanger, which is switched into the cooling circuit. A line section of the cooling circuit is connectable in parallel to the second heat exchanger that includes a hydraulic element, which guides a defined coolant flow to the second heat exchanger.

14 Claims, 2 Drawing Sheets

(56) References Cited

U.S. PATENT DOCUMENTS

| | | | |
|---|---|---|---|
| 2010/0326375 A1* | 12/2010 | Furukoshi et al. | 123/41.09 |
| 2011/0023796 A1* | 2/2011 | Cattani et al. | 123/41.1 |
| 2011/0048012 A1 | 3/2011 | Ernst et al. | |
| 2011/0120396 A1* | 5/2011 | Myers et al. | 123/41.08 |
| 2011/0126783 A1* | 6/2011 | Hwang et al. | 123/41.1 |
| 2012/0137992 A1* | 6/2012 | Kinomuka et al. | 123/41.08 |
| 2012/0198840 A1 | 8/2012 | Stegmaier et al. | |
| 2012/0199084 A1* | 8/2012 | Kinomura | 123/41.08 |

FOREIGN PATENT DOCUMENTS

| | | |
|---|---|---|
| DE | 10 2008 053 066 A1 | 4/2010 |
| DE | 10 2009 028 467 A1 | 2/2011 |
| DE | 10 2010 036 074 A1 | 3/2011 |
| EP | 1 923 549 A2 | 5/2008 |

* cited by examiner

COOLING CIRCUIT

This nonprovisional application claims priority under 35 U.S.C. §119(a) to German Patent Application No. DE 10 2011 085 961.6, which was filed in Germany on Nov. 8, 2011, and which is herein incorporated by reference.

BACKGROUND OF THE INVENTION

1. Field of the Invention

The invention relates to a cooling circuit, in particular for a motor.

2. Description of the Background Art

An overall efficiency of a motor can be increased considerably by the use of previously unused waste heat.

A motor with a drive unit and a device for heat recovery is known from DE 10 2008 053 066 A1. The drive unit has a cooling circuit with a first heat exchanger, which emits heat of a coolant flowing through the cooling circuit to the environment. The device for heat recovery comprises an evaporator that is flowed through by a hot exhaust gas flow. The evaporator is flowed through by a working fluid that is brought to evaporation by the heat of the exhaust gas flow. The gaseous working fluid is fed to an expansion device, from which mechanical energy can be removed. The mechanical energy can be fed directly to the drive train again, for example, or by conversion into electric energy can be used to operate ancillary components. The working fluid flowing out of the expansion device is fed to a second heat exchanger operating as a condenser, which cools the working fluid and converts it into a liquid state. The condenser is coupled to a cooling circuit of the drive unit. A pump guides the liquid working fluid to the evaporator again, in which the working fluid evaporates again and the cycle process begins again. The flow rate of the coolant flow through the condenser and the condensation performance associated therewith fluctuates due to rotational speed changes of the drive unit, for example.

In addition to the embodiment described above, the condenser as is known is also cooled by a separate low-temperature circuit, which, however, requires a high expenditure due to the use of an additional pump, of additional lines and of a further heat exchanger. Furthermore, electrothermal devices for the direct conversion of heat into electric energy are known, which are cooled by an airflow.

SUMMARY OF THE INVENTION

It is therefore an object of the present invention to cool elements of a device for heat recovery via a cooling circuit of the drive unit and to thereby ensure the most constant possible cooling capacity.

In the case of the cooling circuit according to an embodiment of the invention, the second heat exchanger of the heat recovery device is integrated into the cooling circuit of the drive unit, wherein a line section of the cooling circuit connected in parallel to the second heat exchanger comprises a hydraulic element that guides a defined coolant flow to the second heat exchanger. A reliable cooling of the heat recovery device by the cooling circuit of the drive unit is thus ensured in all operating conditions. Since at the same time the pressure loss is limited by the second heat exchanger, the drive unit is also always flowed through with sufficient coolant.

In an embodiment of the cooling circuit, the hydraulic element can be embodied as a pressure relief valve. With low pressure of the coolant flow, this flows entirely over the heat exchanger. If the pressure increases beyond a certain value, a partial flow flows past the heat exchanger over the line section of the cooling circuit connected in parallel. In an advantageous manner the pressure relief valve keeps the coolant flow through the heat exchanger largely constant.

According to a further embodiment, the hydraulic element can be embodied as a throttle valve. The throttle valve is a cost-effective component that ensures a minimum flow rate of coolant through the second heat exchanger and the drive unit.

In a further embodiment a bypass line can be provided, which, seen in the flow direction of the coolant, branches in front of the first heat exchanger and opens after it, wherein a thermostatic valve is arranged after the first heat exchanger, which thermostatic valve mixes coolant from the bypass line and the first heat exchanger to a temperature that can be determined. In an advantageous manner the arrangement in the cooling circuit makes it possible to feed coolant at a largely constant temperature to elements downstream of the thermostatic valve in a wide operating range.

In an embodiment, the second heat exchanger can be arranged after the first heat exchanger seen in the flow direction of the coolant. The second heat exchanger is flowed through by coolant in an advantageous manner, which has the lowest temperature in the cooling circuit. In the cold-start phase, heat inserted into the second heat exchanger helps to bring the drive unit quickly to operating temperature.

According to a further embodiment of the invention, it is provided to arrange the second heat exchanger after the thermostatic valve seen in the flow direction of the coolant. The coolant exiting from the thermostatic valve has a uniformly low temperature level and is particularly suitable for cooling the second heat exchanger. Furthermore, the arrangement has the advantage that in a cold-start phase of the drive unit the coolant heats via the second heat exchanger, whereby the operating temperature can be reached more quickly. Due to the uniform level of the coolant, moreover a marked overcooling in the second heat exchanger is avoided.

According to a further embodiment, the second heat exchanger can be arranged after the drive unit and before the first heat exchanger seen in the flow direction of the coolant. This arrangement renders possible the supply of the second heat exchanger with a coolant flow of the highest possible temperature. This arrangement is advantageous when the necessary cooling temperature in the second heat exchanger is high or at the level of the temperature of the coolant upon exit from the drive unit.

In a further embodiment, a further thermostatic valve interacts with the bypass line such that below a temperature that can be determined the predominant proportion of the coolant circumvents the first heat exchanger. A quick heating up of the drive unit can be achieved with this device.

In a further embodiment a further bypass line can be provided, which branches in the cooling circuit before the first heat exchanger and opens after the second heat exchanger, seen in the flow direction of the coolant. A further thermostatic valve is arranged in the further bypass line. The quantity of heat that is to be dissipated via the second heat exchanger can fluctuate greatly in unsteady vehicle operation. Since the exit temperature of the coolant at the second heat exchanger depends on the quantity of heat to be dissipated, the coolant exit temperature of the drive unit can fluctuate thereby. The arrangement renders possible in an advantageous manner a thermostatic valve-controlled admixture of coolant from the coolant outlet into the coolant inlet of the drive unit, whereby the coolant inlet temperature is to be kept at a largely constant level over a wide operating range.

According to a further embodiment, the further thermostatic valve holds the main branch through the first heat exchanger partially open. A continuous flow through of the main branch renders possible a mixture of hot and colder coolant in the thermostatic valve so that the coolant temperature after the thermostatic valve is largely constant. For example, a one-plate thermostat with open main branch can be used for the further thermostatic valve.

In a further embodiment of the invention the further thermostatic valve has a higher switching temperature than the thermostatic valve. The temperature in the thermostatic valve can be adjusted by mixing coolant before the first heat exchanger and coolant after the first heat exchanger. The switching temperature of the thermostatic valve is lower than that of the further thermostatic valve, which determines the maximum temperature in the main branch before the first heat exchanger. The temperature after the thermostatic valve can thus be derived by admixing cooled coolant after the first heat exchanger from the temperature level of the coolant before the first heat exchanger and thus can be adjusted to a constant level over a wide operating range.

In a further embodiment a pump is arranged directly after the thermostatic valve seen in the flow direction of the coolant. With this arrangement the pump is flowed through by uniformly tempered coolant, whereby a good pump efficiency can be achieved.

In a further embodiment of the invention, the pump is arranged in the cooling circuit before the drive unit. This arrangement has the advantage that the outlet side of the pump can be connected to the drive unit in a manner optimized in terms of installation space, i.e., without piping. The arrangement of the pump can thereby take place at the inlet or outlet side of the coolant.

In an embodiment, manner the second heat exchanger is embodied as a condenser of the device for heat recovery. The condenser is cooled by the cooling circuit of the drive unit. A working fluid of a cycle process, for example, of a Clausius Rankine process, condenses through cooling in the condenser. A condensation device of a a cycle process can be operated in an advantaegeous manner without major additional expenditure with the above-described arrangement, which process permanently improves the overall efficiency of a motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
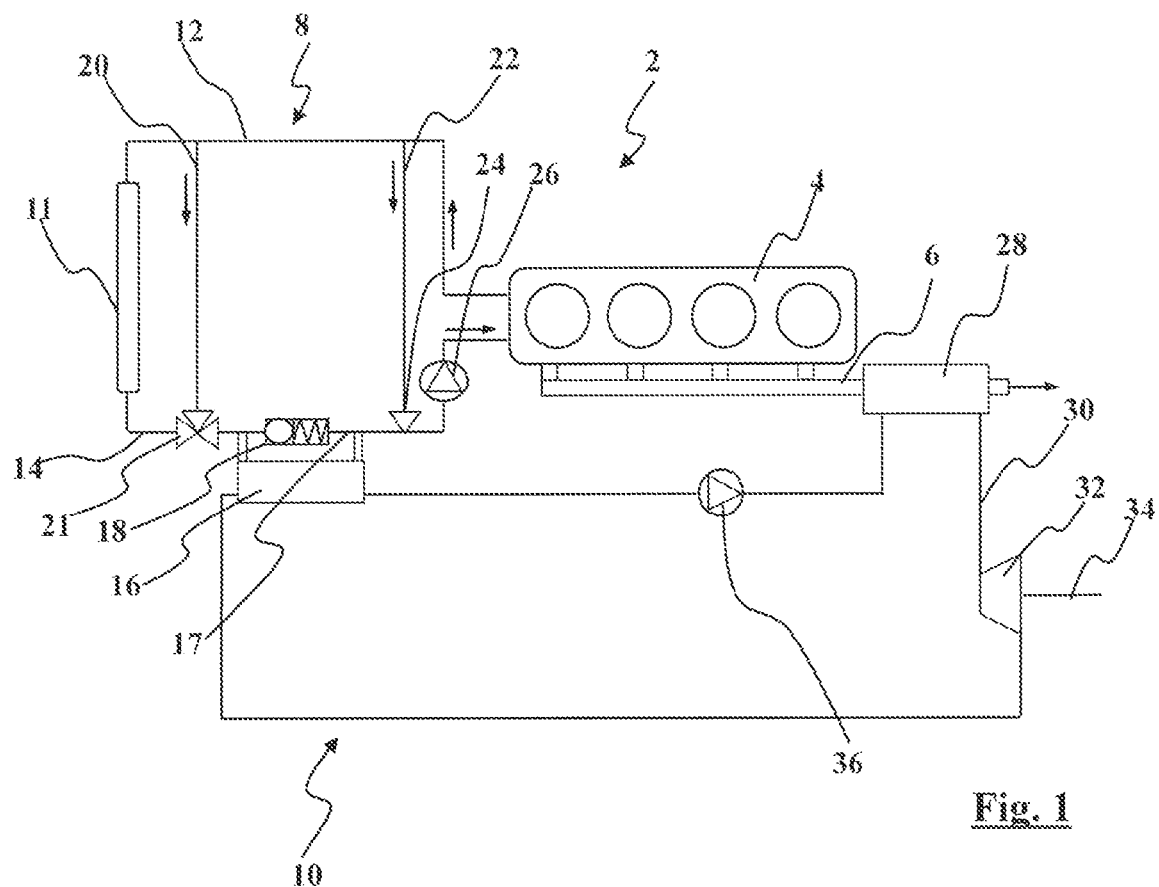
FIG. 1 illustrates a motor with a cooling circuit and with a drive unit with a device for heat recovery from an exhaust gas flow.
Figure 2:
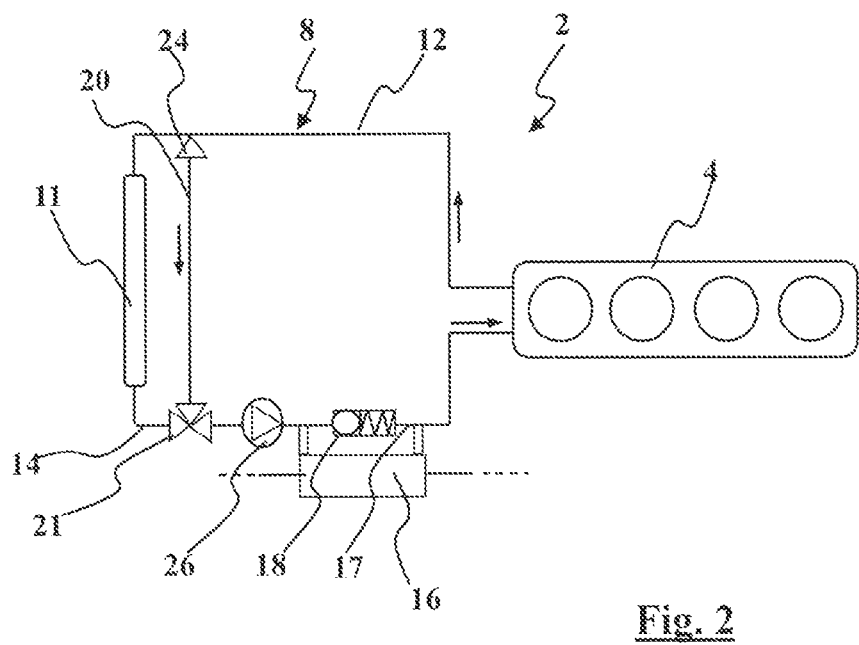
FIG. 2 illustrates an alternative cooling circuit of the drive unit from FIG. 1.
Figure 3:
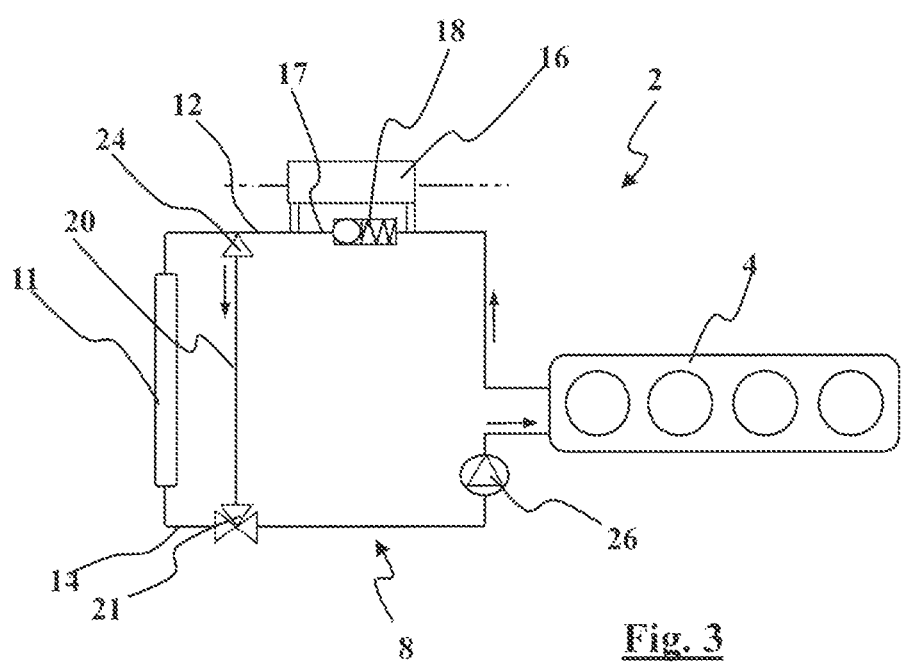
FIG. 3 illustrates a further alternative of the cooling circuit of the drive unit from FIG. 1.

Identical components and components with identical action in FIGS. 1 through 3 are labeled below with the same reference numbers.

The motor shown in FIG. 1 comprises a device for heat recovery 10 and a drive unit 2 embodied as an internal combustion engine with an engine block 4, an exhaust system 6 and a coolant circuit 8.

The coolant circuit 8 comprises a first heat exchanger 11, which is connected via a feed line and return line 12, 14 to the engine block 4 of the drive unit 2. A second heat exchanger 16 operating as a condenser is connected in parallel to a second section 17 of the return line 14. A pressure relief valve 18 is arranged in the section 17 running parallel to the condenser 16.

A bypass line 20 branches out of the feed line 12 before the first heat exchanger 11 and opens before the condenser 16 into a thermostatic valve 21 arranged in the return line 14.

A further bypass line 22 likewise branches out of the feed line 12, it opens into a further thermostatic valve 24 arranged after the condenser 16 in the return line 14. A pump 26 is arranged between the further thermostatic valve 24 and the engine block 4.

The device for heat recovery 10 comprises a closed steam cycle 30 with an evaporator 28, an expander 32, the condenser 16 incorporated in the cooling circuit 8 and a further pump 36. Mechanical work can be removed from the expander 32 on the shaft 34.

The function of the motor is described below.

Hot exhaust gas from the exhaust system 6 flows through the evaporator 28, which is flowed through by a working fluid conveyed by the further pump 36. The working fluid of the device for heat recovery 10 evaporates, flows in the steam cycle 30 to the expander 32 and does mechanical work, which can be used via the shaft 34 and a device (not shown) in the drive train of a motor vehicle as propulsive force. In the condenser 16 cooled by the cooling circuit 8 the working fluid liquefies and the further pump 36 guides the working fluid again to the evaporator 28.

In the cooling circuit 8 the pump 26 conveys coolant through the engine block 4 and the cooling circuit 8. In order to achieve the quickest possible warming up of the internal combustion engine 2, the further thermostatic valve 24 in the further bypass line 22 is largely opened up to a temperature of, for example, 85° C., so that the coolant, circumventing the first heat exchanger 11, heats up quickly. The further thermostatic valve 24 thereby guides and the bypass line 20 further guides a partial quantity of the coolant flow to the first heat exchanger 11. The thermostatic valve 21 mixes hot coolant flowing through the bypass line 20 and coolant cooled by the first heat exchanger 11 to a temperature of 70° C., for example. If the temperature of 85° C. is exceeded, the further thermostatic valve 24 closes and the predominant part of the coolant flows to cool the internal combustion engine 2 through the first heat exchanger 11. Nevertheless, even in this operating state the thermostatic valve 21 mixes hot coolant flowing through the bypass line 20 and coolant cooled by the first heat exchanger 11. The condenser 16 is thus flowed through over a wide operating range of the internal combustion engine 2 by coolant at a largely constant temperature of 70° C., for example, an overcooling of the working fluid of the device for heat recovery 10 is avoided.

The tempered coolant flowing out of the thermostatic valve 21 flows into the condenser 16, wherein, once a pressure that can be determined is exceeded, the pressure relief valve 18 opens and a partial quantity flows over the section 17 of the return line 14 connected in parallel to the condenser 16. The arrangement secures a largely constant flow through or a minimum flow through of the coolant through the condenser 16 and a constant condensation performance associated therewith.

FIG. 2 shows an alternative cooling circuit 8 to that shown in FIG. 1. The steam cycle, not shown, corresponds to that from FIG. 1, the condenser 16 is hereby connected to the steam cycle 30 of the device for heat recovery 10 in the same manner as in FIG. 1.

In the cooling circuit 8 according to the representation in FIG. 1 the first heat exchanger 1 is connected via the feed line and return line 12, 14 to the engine block 4. The return line 14 is connected in parallel to the condenser 16. The pressure relief valve 18 is likewise arranged in the section 17 of the return line 14 running parallel to the condenser 16. The bypass line 20 branches before the first heat exchanger 11 from the feed line 12 and opens after the first heat exchanger 11 via the thermostatic valve 21 into the return line 14. The further thermostatic valve 24 is here provided in the branch from the feed line 12. The coolant pump 26 is arranged between the thermostatic valve 21 and the condenser 16.

In the warm-up phase of the internal combustion engine 2, up to a switching temperature that can be predetermined of 95° C., for example, the further thermostatic valve 24 adopts a switching position such that for the rapid heating of the internal combustion engine 2 a main flow of the coolant, largely circumventing the first heat exchanger 11, flows from the feed line into the return line 12, 14 and a partial flow flows via the first heat exchanger 11. The main flow and partial flow of the coolant is mixed in the thermostatic valve 21. The thermostatic valve 21 is adjusted, for example, such that from a coolant temperature of approx. 70° C. it mixes cooled coolant from the first heat exchanger 11 with the coolant from the bypass line 20.

After the switching temperature of the further thermostatic valve 24 has been exceeded, the preponderant part of the coolant flows via the first heat exchanger 11. As long as the coolant from the first heat exchanger 11 does not exceed the temperature of 70° C., the thermostatic valve 21 feeds coolant tempered to 70° C. to the pump 26 or to the condenser 16. The arrangement makes it possible to provide tempered coolant to the condenser 16 and to the pump 26 over a wide operating range.

The condenser 16 and the pressure relief valve 18 connected in parallel interact in the same way as already described in FIG. 1.

The structure of the cooling circuit 8 from FIG. 3 corresponds essentially to that of FIG. 2. In contrast to FIG. 2, the condenser 18 with the pressure relief valve 18 connected in parallel is arranged in the feed line 12 between the internal combustion engine 2 and the first heat exchanger 11.

The pump 26 arranged before the engine block 4 in the return line 14 conveys coolant in the cooling circuit 8. Hot coolant flows out of the internal combustion engine 2 through the condenser 16. Up to a defined pressure in the feed line 12, the entire coolant quantity flows through the condenser 16, when the pressure is exceeded, the pressure relief valve 18 opens and a partial quantity of the coolant flows past the condenser 16 directly to the first heat exchanger 11. The condenser 16 is thereby flowed through by a largely constant coolant flow at high temperature. A thermostatic valve 21 mixes cooled-down coolant flowing out of the first heat exchanger 11 and uncooled hot coolant flowing via a bypass line 20 to a defined temperature.

The pump 26 guides the coolant tempered by mixing in the thermostatic valve 21 to the engine block 4 again. A further thermostatic valve 24 guides up to a certain temperature the coolant flow via the bypass line 20 largely past the first heat exchanger 11 so that the internal combustion engine 2 warms up as quickly as possible. According to the embodiment in FIG. 2, a partial flow always flows via the first heat exchanger 11, so that a mixing of coolant of different temperature level is possible in the thermostatic valve and the pump 26 as well s the drive unit are supplied with tempered coolant.

In further exemplary embodiments, not shown, in FIG. 1 through FIG. 3 a throttle valve instead of the pressure relief valve 18 is connected in parallel to the condenser 16. The throttle valve ensures a fixed division of the coolant flow through the condenser 16 and the bypass line 17 connected in parallel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling circuit for cooling a motor of a vehicle, the cooling circuit comprising:
   a drive unit that is configured to facilitate a flow of a heated coolant in the cooling circuit, the heated coolant being heated in the drive unit;
   a first heat exchanger that is adapted to emit heat from the coolant to the environment;
   a device for heat recovery;
   a second heat exchanger, which is switched into the cooling circuit; and
   a line section of the cooling circuit connected in parallel to the second heat exchanger, the line section including a hydraulic element, such that the hydraulic element is connected in parallel with the second heat exchanger, wherein the hydraulic element feeds a defined coolant flow to the second heat exchanger,
   wherein a bypass line is provided, which seen in a flow direction of the coolant, branches in the cooling circuit before the first heat exchanger and opens after it, and wherein a thermostatic valve is arranged after the first heat exchanger which mixes coolant from the bypass line and the first heat exchanger to a temperature that is selectable.

2. The cooling circuit according to claim 1, wherein the hydraulic element is configured as a pressure relief valve.

3. The cooling circuit according to claim 1, wherein the hydraulic element is configured as a throttle valve.

4. The cooling circuit according to claim 1, wherein the second heat exchanger is arranged after the first heat exchanger in a flow direction of the coolant.

5. The cooling circuit according to claim 1, wherein the second heat exchanger is arranged after the thermostatic valve in the flow direction of the coolant.

6. The cooling circuit according to claim 1, wherein the second heat exchanger is arranged after the drive unit and before the first heat exchanger in a flow direction of the coolant.

7. The cooling circuit according to claim 1, wherein a further thermostatic valve interacts with the bypass line such that below a temperature that is selectable, a predominant proportion of the coolant circumvents the first heat exchanger.

8. The cooling circuit according to claim 7, wherein the further thermostatic valve has a higher switching temperature than the thermostatic valve.

9. The cooling circuit according to claim 7, wherein the further thermostatic valve holds a main branch through the first heat exchanger partially open.

10. The cooling circuit according to claim 1, wherein a further bypass line in the flow direction of the coolant branches in the cooling circuit before the first heat exchanger and opens after the second heat exchanger, and wherein a further thermostatic valve is arranged in the further bypass line.

11. The cooling circuit according to claim 1, wherein a pump is arranged directly after the thermostatic valve in the flow direction of the coolant.

12. The cooling circuit according to claim 1, wherein a pump is arranged in the coolant circuit before the drive unit in a flow direction of coolant.

13. A cooling circuit for cooling a motor of a vehicle, the cooling circuit comprising:
- a drive unit that is configured to facilitate a flow of a heated coolant in the cooling circuit, the heated coolant being heated in the drive unit;
- a first heat exchanger that is adapted to emit heat from the coolant to the environment;
- a device for heat recovery;
- a second heat exchanger, which is switched into the cooling circuit; and
- a line section of the cooling circuit connected in parallel to the second heat exchanger, the line section including a hydraulic element, such that the hydraulic element is connected in parallel with the second heat exchanger, wherein the hydraulic element feeds a defined coolant flow to the second heat exchanger,
- wherein the second heat exchanger is configured as a condenser of the device for heat recovery.

14. A cooling circuit for cooling a motor of a vehicle, the cooling circuit comprising:
- a drive unit that facilitates a flow of a heated coolant in the cooling circuit, the heated coolant being heated in the drive unit;
- a first heat exchanger that emits heat from the coolant to the environment; and
- a second heat exchanger,
- wherein the second heat exchanger is connected in parallel to a line section of the cooling circuit, the line section including a hydraulic element, such that the hydraulic element is connected in parallel with the second heat exchanger, and
- wherein the hydraulic element feeds a defined coolant flow to the second heat exchanger,
- the cooling circuit further comprising a first bypass line, which seen in a flow direction of the coolant, branches in the cooling circuit before the first heat exchanger and opens after the first heat exchanger, and wherein a first thermostatic valve is arranged after the first heat exchanger which mixes coolant from the bypass line and the first heat exchanger to a temperature that is selectable; and
- further comprising a second bypass line in the flow direction of the coolant that branches in the cooling circuit before the first heat exchanger and opens after the second heat exchanger, and wherein a second thermostatic valve is arranged in the second bypass line.

\* \* \* \* \*